J. Power.
Cork Machine.
Nº 13,200.    Patented July 3, 1855.
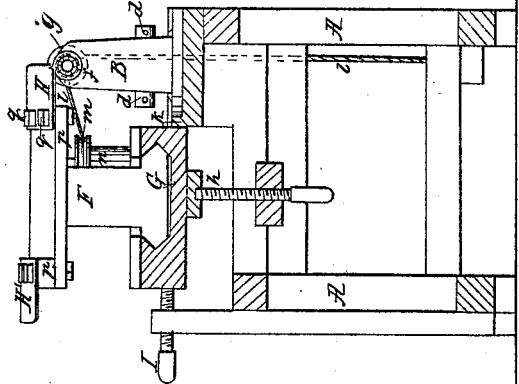
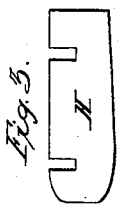
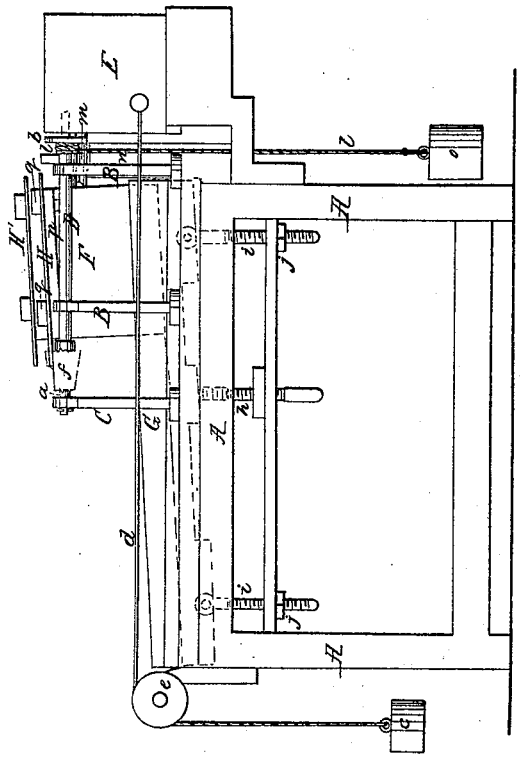

UNITED STATES PATENT OFFICE.

JOHN POWER, OF BOSTON, MASSACHUSETTS.

CORK-MACHINE.

Specification of Letters Patent No. 13,200, dated July 3, 1855.

*To all whom it may concern:*

Be it known that I, JOHN POWER, of Boston, in the county of Suffolk and State of Massachusetts, have invented certain new and useful Improvements in Machinery for Cutting Corks for Bottles and other Vessels; and I do hereby declare that the following is a full, clear, and exact description of the same, reference being had to the accompanying drawings, forming part of this specification, in which—

Figure 1, is a front elevation, and Fig. 2, a transverse section, of a machine constructed according to my invention, Fig. 3, is a plan of one of the knives.

Similar letters of reference indicate corresponding parts in the several figures.

This invention consists in a certain method of applying knives to operate upon the corks while the latter receive a rotary motion, whereby the corks may be cut of any desired size either parallel or with any desirable degree of taper, and if desired of different sizes at the same time, and with a perfectly smooth cut.

A, A, is a framing supporting all the working parts of the machine.

B, B, and C, are three fixed heads of which the two former contain the bearings for a lathe mandrel D, and the latter the bearing for a revolving dog $a$. The back end of the mandrel D, enters into and fits with a collar $b$, against a sliding head E, which slides on a suitable bed, and which has a weight $c$, attached to it by a cord $d$, running over pulleys $e$, at the opposite end of the machine. These weights draw up the sliding head and cause the cork $f$, (which is shown in red color) to be held between the dog $a$, and the dog $g$, at the end of the mandrel.

F, is the knife carriage which is arranged to slide in a bed G, which is adjustable so that it can be set perfectly parallel with the mandrel D, to turn or cut parallel corks, or at an inclination as shown in Fig. 1 to turn taper corks. In order to enable the bed to be adjusted readily, it is supported at as near its center as may be convenient on the point of a screw $h$, which works in a fixed female screw in the framing of the machine, and serves to regulate its height, and the size of the corks, and near the ends it has attached to it two screws $i$, $i$, which are adjustable by nuts $j$, $j$, to raise either end, and lower the other, and which serve to level or set it at any inclination. When properly adjusted the bed G, is secured by a screw I, which confines it against a bearing $k$, see Fig. 2.

H, is the knife to cut the cork $f$. This knife has its edge straight the greater portion of its length but slightly curved at the end which is to commence the cut. It is bolted to a flange $p$, of the carriage by bolts $q$, $q$.

The machine is to be set in operation by moving the knife carriage along the bed G, commencing from the position indicated in Fig. 1. This may be effected by a rack attached to the carriage and a pinion upon a shaft the end of which may stand out with a crank in front of the machine in a convenient position for the operator to turn it by hand. The rotary movement of the mandrel to revolve the cork in contact with the knife while the latter moves lengthwise is given by a band $l$, which is secured to the carriage and is conducted around a pulley $m$, on a fixed stand $n$, to the mandrel around which it takes one or two turns as shown in Fig. 1. The band is kept tight by a weight $o$, suspended from it. In moving the knife carriage from the position shown in Fig. 1, the weight $o$, is raised and after the cork is cut this weight is sufficient to draw back the carriage to the position shown in Fig. 1. When the cork is cut, the head E, and the mandrel D, are drawn back when the cork falls out, and the operator inserts another between the dogs and allows the mandrel to come up again. The drawing back of the mandrel may be effected by a treadle, to leave the operator's hands both at liberty. The longitudinal movement of the knife with its edge in contact with the cork produces a drawing cut like that produced in cutting by hand.

The machine may be made double to cut two corks at once by securing another knife H', to the opposite side of the carriage F, as shown in the drawings and by adding to the opposite side of the machine another mandrel and the necessary appendages to hold and revolve the cork. If the two knives and mandrels are set at the same height the two corks will be of the same size, but by packing up one of the knives with packing pieces $r$, as shown under H', in Figs. 1 and 2, two corks of different sizes may be cut at once.

Having thus fully described my invention

I will proceed to state, what I claim and desire to secure by Letters Patent.

1. I claim supporting the bed of the knife carriage near its center upon a bearing screw $h$, and applying adjusting screws $i, i$, near its ends, for the purpose of making it adjustable at different heights and either level or at different inclinations substantially as herein set forth.

2. I claim giving rotary motion to the mandrel D, or its equivalent, which revolves the cork, by means of a band $l$, connected with the knife carriage and carrying a weight $o$, the weight serving to keep tight the band and transmit motion from the knife carriage to the cork during the cutting operation and also to draw back the carriage after the cutting operation substantially as herein described.

JOHN POWER.

Witnesses:
   Jas. Geo. Mason,
   J. W. Coombs.